(12) United States Patent
Poutiainen

(10) Patent No.: US 11,910,741 B2
(45) Date of Patent: Feb. 27, 2024

(54) PLANTING TOOL

(71) Applicant: Fiskars Finland Oy Ab, Helsinki (FI)

(72) Inventor: Vesa Poutiainen, Espoo (FI)

(73) Assignee: Fiskars Finland Oy Ab, Helsinki (FI)

( * ) Notice: Subject to any disclaimer, the term of this patent is extended or adjusted under 35 U.S.C. 154(b) by 749 days.

(21) Appl. No.: 17/073,723

(22) Filed: Oct. 19, 2020

(65) Prior Publication Data

US 2021/0127565 A1  May 6, 2021

(30) Foreign Application Priority Data

Nov. 4, 2019  (FI) ...................................... 20195945

(51) Int. Cl.
*A01C 7/20* (2006.01)
*A01C 5/02* (2006.01)

(52) U.S. Cl.
CPC ................ *A01C 7/206* (2013.01); *A01C 5/02* (2013.01)

(58) Field of Classification Search
CPC .............. A01C 7/02; A01C 7/206; A01C 5/02
See application file for complete search history.

(56) References Cited

U.S. PATENT DOCUMENTS

| | | | | |
|---|---|---|---|---|
| 3,749,034 A | * | 7/1973 | Bergius | A01C 5/02 111/92 |
| 4,444,131 A | * | 4/1984 | Marttinen | A01C 5/02 111/107 |
| 4,706,582 A | * | 11/1987 | Keskilohko | A01C 5/02 111/98 |
| 5,052,314 A | * | 10/1991 | Leini | A01C 5/02 111/98 |
| 5,080,027 A | * | 1/1992 | Brothers | A01C 5/02 111/99 |
| 5,431,467 A | * | 7/1995 | Mlecka | A01C 5/02 294/51 |

(Continued)

FOREIGN PATENT DOCUMENTS

| | | |
|---|---|---|
| DE | 822738 | 11/1951 |
| GB | 0 699 063 A | 10/1953 |

(Continued)

OTHER PUBLICATIONS

Extended European Search Report for European Application No. 20205160.3, dated Mar. 17, 2021, 7 pages.

*Primary Examiner* — Jamie L McGowan
(74) *Attorney, Agent, or Firm* — FOLEY & LARDNER LLP

(57) ABSTRACT

A planting tool includes a tube element with an inlet end and an outlet end. A ground support is rotatably connected to the tube element via a pivot point and includes a first part with a pedal area and a second part with a hatch area. A mechanism has a first clamp and a second clamp. In an open state the mechanism prevents movement between the hatch area and the outlet end and maintains the hatch area at a distance from the outlet end by contact between the first and second clamp. In a closed state the mechanism prevents movement between the hatch area and the outlet end and maintains the hatch area in contact with the outlet end. The first clamp includes a switch allowing a user to change position of the first clamp to switch the state of the mechanism from the open state to the closed state.

9 Claims, 5 Drawing Sheets

(56) References Cited

U.S. PATENT DOCUMENTS

| | | | | |
|---|---|---|---|---|
| 5,438,940 A | * | 8/1995 | Bristow | A01C 5/02 111/98 |
| 5,558,378 A | * | 9/1996 | Byrd | A01C 5/02 294/50.8 |
| 5,584,256 A | * | 12/1996 | Fleming | A01C 5/02 111/95 |
| 2020/0060069 A1 | * | 2/2020 | Larson, Sr. | A01C 7/02 |
| 2020/0077575 A1 | * | 3/2020 | Hua | A01C 5/02 |
| 2021/0127565 A1 | * | 5/2021 | Poutiainen | A01C 5/02 |

FOREIGN PATENT DOCUMENTS

| | | | | |
|---|---|---|---|---|
| RU | 182402 | | 8/2018 | |
| WO | WO-9416547 A1 | * | 8/1994 | A01C 15/02 |

* cited by examiner

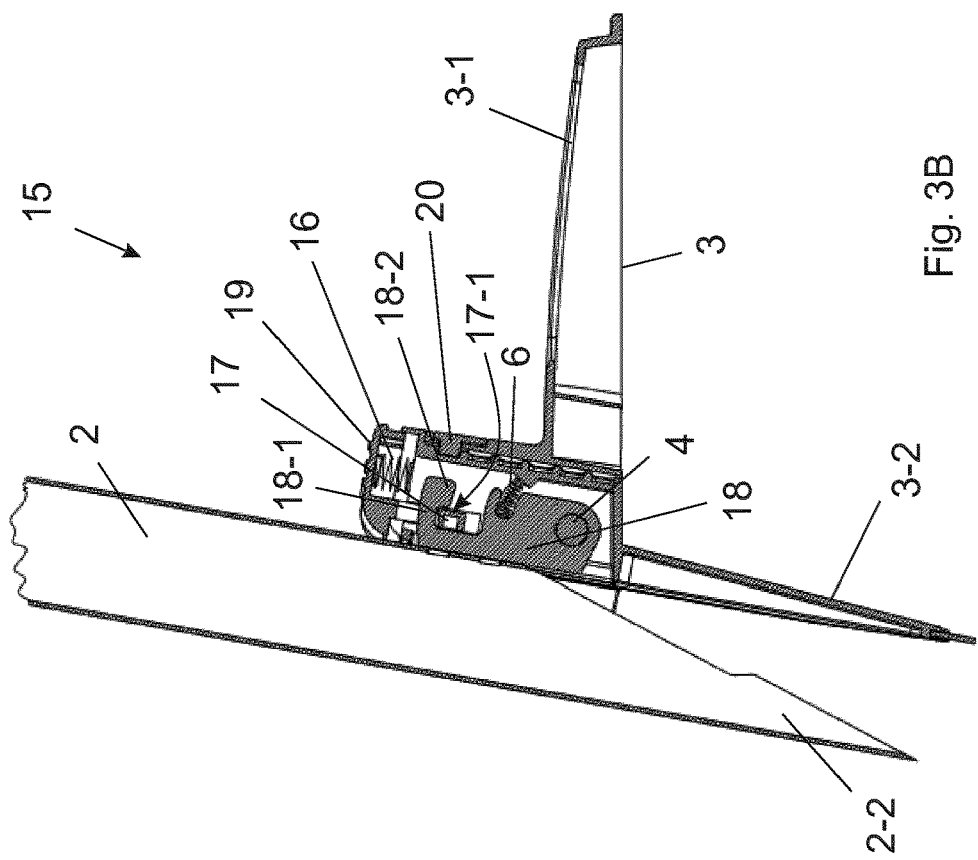
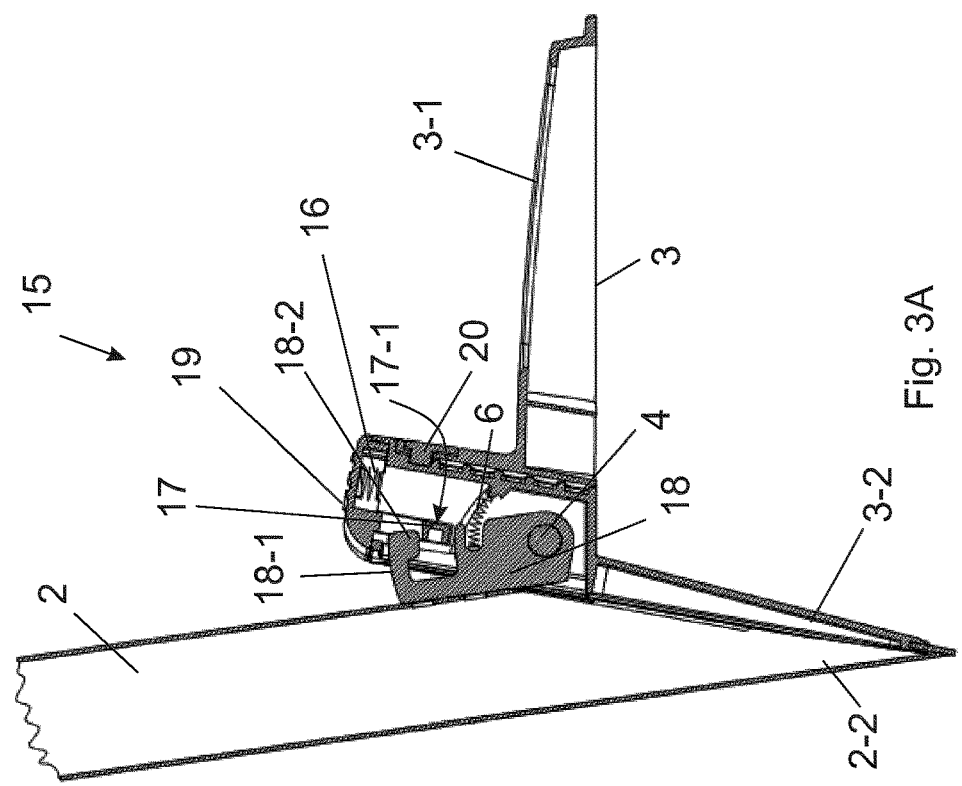

PLANTING TOOL

CROSS-REFERENCE TO RELATED APPLICATIONS

This application claims the benefit of priority to Finland Patent Application No. 20195945, filed Nov. 4, 2019, the complete disclosure of which is hereby incorporated herein by reference in its entirety.

FIELD OF THE INVENTION

The present invention relates to gardening equipment, and more particularly to a planting tool.

BACKGROUND OF THE INVENTION

Planting, for instance a bulb, needs to be done in a certain depth below the ground level. The ground can be hard and digging through a hole requires a lot of effort when done with a shovel or a trowel.

Some existing planting tools use a hollow tube with an opening, which is pushed into the ground. The bulb is dropped inside the tube and when the tube is partly under the ground level, the bulb is released from the tube.

One of the problems associated with this technique is how to release the bulb without the risk of the bulb getting stuck in the tube while planting in hard soil.

BRIEF DESCRIPTION OF THE INVENTION

An object of the present invention is to provide a planting tool to overcome the above problems. The objects of the invention are achieved by an arrangement which are characterized by what is stated in the independent claim. The preferred embodiments of the invention are disclosed in the dependent claims.

The invention is based on the idea of having a mechanism in a ground support which is capable of efficiently controlling the state of a hatch area during various phases of planting.

BRIEF DESCRIPTION OF THE DRAWINGS

In the following the invention will be described in greater detail by means of preferred embodiments with reference to the attached drawings, in which

FIGS. 3A and 3B illustrate closer cross-sectional views of a second embodiment of the planting tool in the closed state and the open state, respectively;

DETAILED DESCRIPTION OF THE INVENTION

Figure 1:
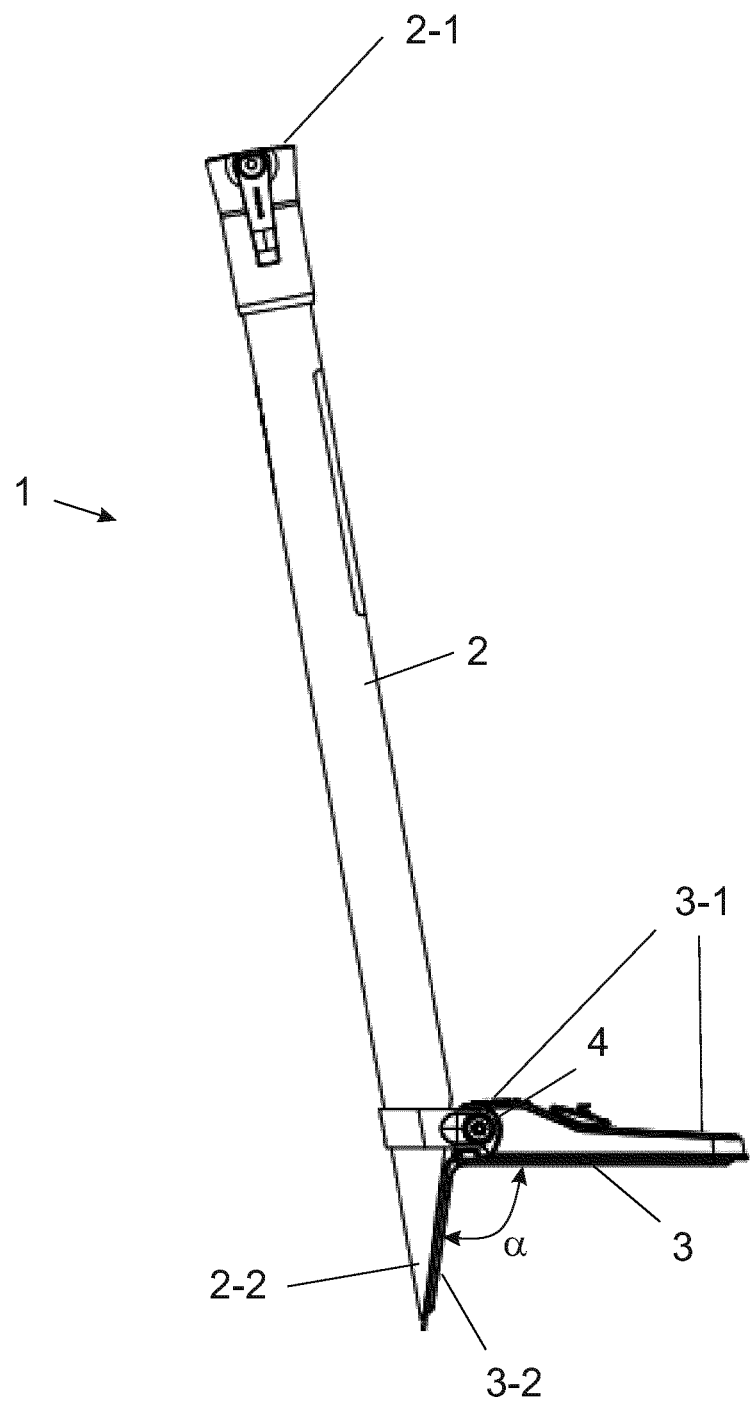
FIG. 1 illustrates a first embodiment of a planting tool.

FIG. 1 illustrates a first embodiment of a planting tool 1 comprising a tube element 2 with an inlet end 2-1 and an outlet end 2-2. The tube element 2 may be a hollow tube made of a single part or several sections attached to each other forming the tube element 2. The tube element 2 may be made of, for instance, polymer or metal, such as aluminium, steel or stainless steel. A handle may be attached near the inlet end 2-1 for a better grip of the planting tool 1. The outlet end 2-2 is provided as a truncated cylinder with a sharp tip to provide access to the inside of the tube element 2 via the side of the tube element 2. One alternative is that the access is provided in a direction substantially perpendicular to the longitudinal axis of the tube element 2.

A ground support 3 is rotatably connected to the tube element 2 via a pivot point 4. The ground support 3 comprises a first part 3-1 with a pedal area and a second part 3-2 with a hatch area. The pedal area 3-1 is arranged to be large enough to have a sufficient contact surface for a foot of the user. The pedal area may be slightly elevated from the bottom plane of the ground support 3. The hatch area 3-2 has a shape with a sharp tip which may match the outline of the outlet end 2-2 of the tube element 2. The hatch area 3-2 may be planar or slightly curved to form a cone with the outlet end 2-2 in a closed state.

The sharp tip facilitates the penetration through the ground in the closed state. By pressing the pedal area 3-1 with the foot, the hatch area 3-2 connected to the outlet end 2-2 is pushed into the ground until the bottom plane of the ground support 3 touches the ground level.

The hatch area 3-2 and the outlet end 2-2 forms the closed state when they are in contact with each other. In this context, the term "closed state" refers to the tube element 2 being impassable through the outlet end 2-2 by means of the hatch area 3-2. In an open state the hatch area 3-2 is not in contact with the outlet end 2-2 which allows the bulb to pass from the tube element 2 into the ground. In this context, the term "open state" refers to the tube element being passable through the outlet end 2-2 when the hatch area 3-2 maintains at a distance away from the outlet end 2-2.

The ground support 3 has an angled shape where the first part 3-1 and second part 3-2 protrude into directions forming an angle α between them which may be as large as 90° or more. The bottom plane of the ground support 3 may be made of polymer or metal such as aluminium, steel or stainless steel while the pedal area may be made of polymer.

Figure 2A:
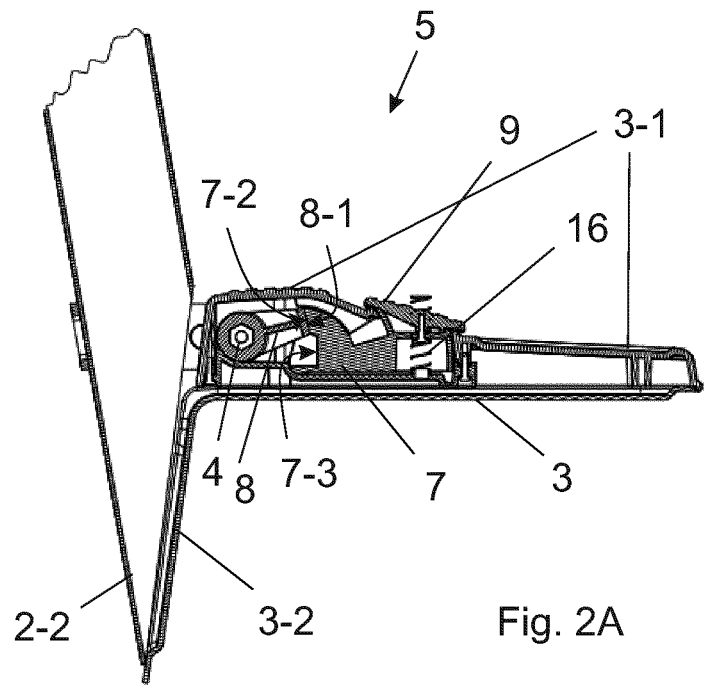
FIGS. 2A-2C illustrate closer views of the first embodiment, wherein 2A and 2B illustrate cross-sectional views in a closed state and an open state, respectively.
Figure 2B:
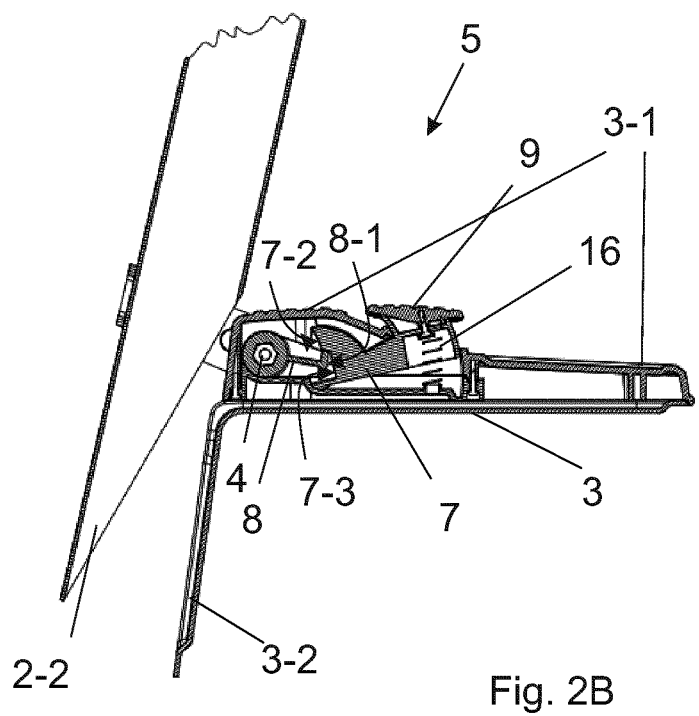
Figure 2C:
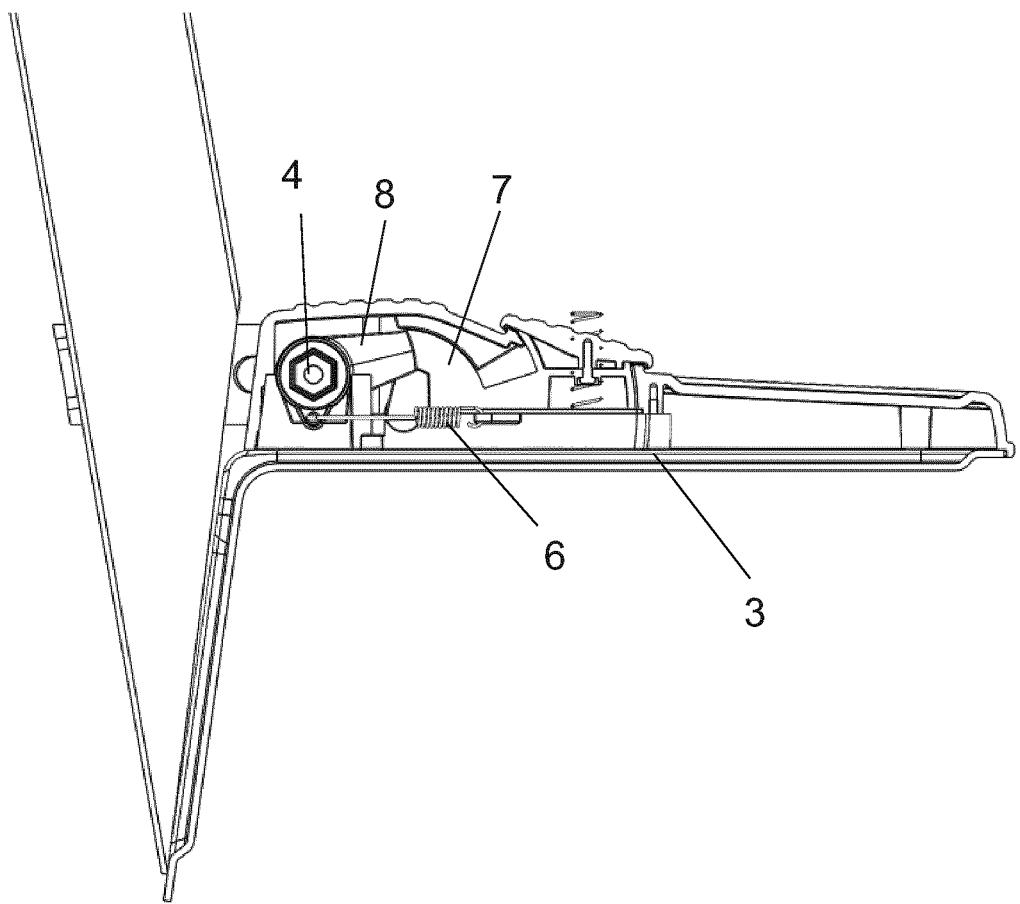

FIGS. 2A-2C illustrate closer views of the first embodiment, wherein FIGS. 2A and 2B illustrate cross-sectional views in a closed state and an open state, respectively. The planting tool 1 comprises a mechanism 5 directly above and connected to the ground support 3. The mechanism 5 comprises a first clamp 7 and a second clamp 8. The mechanism 5 is configured to switch from the closed state to the open state and vice versa.

In the open state the mechanism 5 prevents movement between the hatch area 3-2 and the outlet end 2-2 and maintains the hatch area 3-2 at a distance from the outlet end 2-2 by means of contact between the first clamp 7 and the second clamp 8. In the closed state the mechanism 5 prevents movement between the hatch area 3-2 and the outlet end 2-2 and maintains the hatch area 3-2 in contact with the outlet end 2-2. This can be accomplished by gravity on the ground support 3, for instance. Alternatively, it can be accomplished by means of a spring force from a first spring 6 in such way that the mechanism 5 can be switched to the open state against the spring force. The first spring 6 may be pre-tensioned during the closed state which provides a better contact between the outlet end 2-2 and the hatch area 3-2, and may be arranged between a predetermined point of the ground support 3 and the second clamp 8 as shown in FIG. 2C.

The first clamp 7 comprises a switch 9 which allows the user to change position of said first clamp 7 to switch the state of the mechanism 5 from the open state to the closed state. The switch 9 may be fixedly connected to the first clamp 7 and made of polymer with indentation for more friction.

The second clamp 8 is connected to the pivot point 4 and is fixedly attached to the tube element 2 with a protruding first mating surface 8-1. The first clamp 7 is movably arranged to the ground support 3 and is provided with a second 7-2 and a third mating surface 7-3 facing the tube element 2. In this context, the term "mating surface" refers to a surface having a counter mating surface which are in contact with each other during the open or closed state. The mating surface can be for instance flat or angular which does not let the mating surfaces to slide against each other without applied force.

In the open state the first mating surface 8-1 contacts the third mating surface 7-3, and in the closed state the first mating surface 8-1 contacts the second mating surface 7-2. The switch 9 is arranged to move the first clamp 7 to release the contact between the first mating surface 8-1 and the third mating surface 7-3.

When the user wants to switch the mechanism 5 from the closed state to open state, it can be done by moving the ground support 3 around the pivot point 4 towards the inlet end 2-1 against the spring force of the first spring 6, if such a first spring 6 is provided, alternatively against the gravity alone. In practice, the easiest and most effortless way to achieve the switching from the closed state to open state is by pulling the tube element 2 towards the user while the user may press the pedal area 3-1 to hold the ground support 3 in place. Therefore, in hard soil, for instance, due to the substantial length of the tube element 2, the user can create a significant torque around the pivot point 4 which forces the sharp tip of the outlet end 2-2 to cut easily through the soil with a large force.

A second spring 16 is connected to the switch 9 for returning the switch 9 and the first clamp 7 to an initial position after the user has changed the position of said first clamp 7 with the switch 9. The second spring 16 may be curved with a radius of curvature.

After the mechanism 5 is switched to the open state, the second spring 16, the first clamp 7 and the second clamp 8 are arranged to maintain the position. This enables the bulb to be released from the tube element 2 without the risk that the bulb gets stuck. The present invention is not restricted to plant only bulbs. It can be used to plant any type of seedlings that needs to be planted in the soil below the ground level.

Similarly, with ease and effortless, a tap against the switch 9 releases the second clamp 8 from the third mating surface 7-3. While the switch 9 is pressed down, the second spring 16 is tensed and the ground support rotates around the pivot point 4 in such a way that the hatch area 3-2 approaches the outlet end 2-2. At the same time the first mating surface 8-1 separates from the third mating surface 7-3 and because of the rotation around the pivot point 4, approaches the second mating surface 7-2 and is in contact with the second mating surface 7-2 when the mechanism 5 reaches the closed state.

FIGS. 3A and 3B illustrate closer cross-sectional views of a second embodiment in a closed state and an open state, respectively. The embodiment is very similar to the one explained in connection with FIGS. 2A and 2B. Therefore, the embodiment of FIGS. 3A and 3B are mainly explained by pointing out the differences between these embodiments.

In the second embodiment, the mechanism 15 further comprises a depth adjustment system 20. The first clamp 17 is movably arranged to the ground support 3 and is provided with a contact surface 17-1 facing away from the tube element 2. The second clamp 18 is fixedly attached to the tube element 2 with an end 18-1 protruding away from the tube element 2 and having a shoulder 18-2. The first clamp 17 may have a shape of a bolt and the second clamp 18 may have a shape of a hook arranged to fit the first clamp 17 in its recess.

The first spring 6 is connected to the second clamp 18. When the user wants to switch the mechanism 15 from the closed state to open state, it can be done by moving the ground support 3 around the pivot point 4 towards the inlet end 2-1 against the spring force. When the first clamp 17 reaches the recess of the second clamp 18, the second spring 16 forces the first clamp 17 along with the switch 19 to move in the direction of the spring force of the second spring 16. This results in the open state.

In the open state the shoulder 18-2 contacts the contact surface 17-1 and in the closed state the shoulder 18-2 and the contact surface 17-1 are separated from each other. The first clamp 17 is fixedly connected to the switch 19. The switch 19 is arranged to move the first clamp 17 to release the contact between the shoulder 18-2 and the contact surface 17-1.

The second spring 16 is connected to the switch 19 for returning the switch 19 and the first clamp 17 to an initial position after the user has changed the position of said first clamp 17 with the switch 19. A tap against the switch 19 releases the second clamp 18 from the first clamp 17 because of the spring force from the first spring 6 and the mechanism 15 switches to the closed state.

Figure 4A:
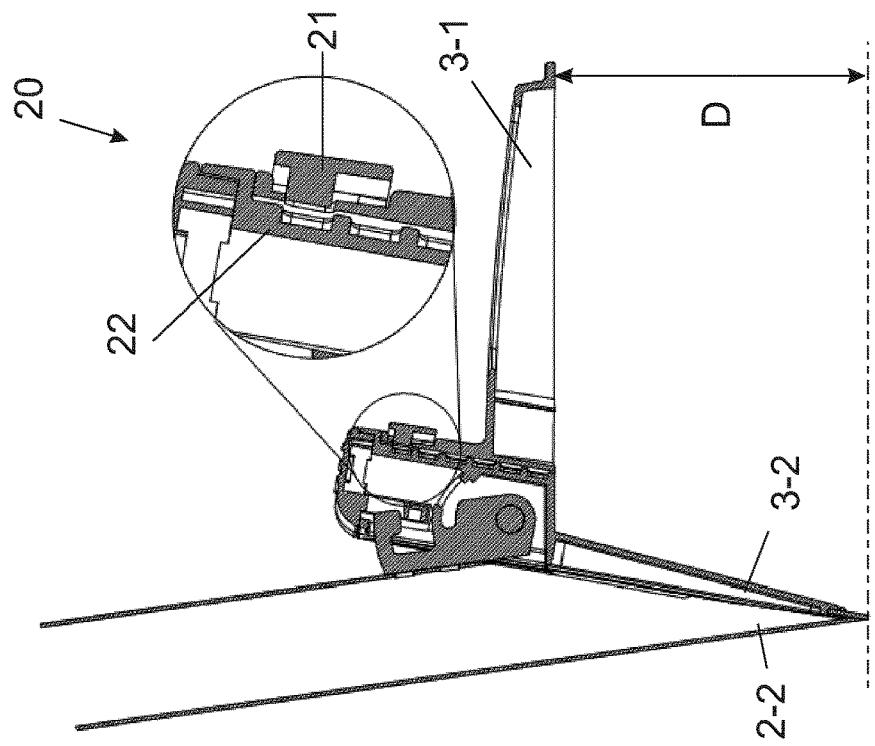
FIGS. 4A and 4B illustrate a closer view of a depth adjustment system of the second embodiment of the planting tool.
Figure 4B:
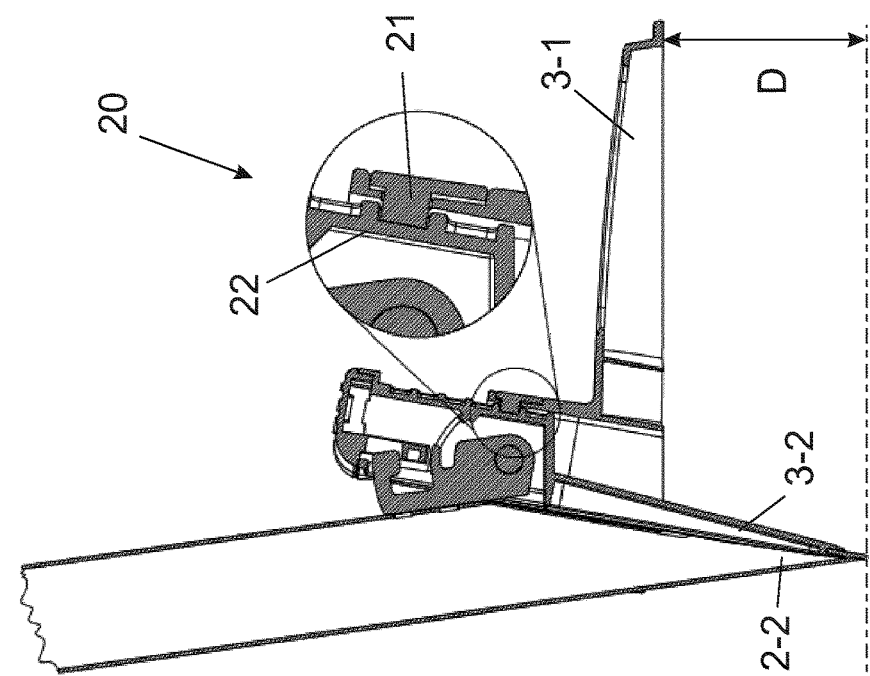

FIGS. 4A and 4B illustrate the depth adjustment system 20 of the second embodiment in a locked position and unlocked position, respectively. The depth adjustment system 20 is part of the mechanism 15 and comprises a first part 3-1 with a pedal area and a second part 3-2 with a hatch area. The first part 3-1 is slidably movable along the second part 3-2 to increase or decrease a distance D between the first part 3-1 and the tip of the outlet end 2-2. The distance D can be adjusted whether the bulb or seedling needs to be planted in the shallow or deeper depth below the ground level.

The second part 3-2 is fixedly connected to a locking plate 22. The locking plate 22 is facing the first part 3-1 and comprises horizontal protrusions and recessions in predetermined intervals. The first part 3-1 comprises a user actuated locking element 21 facing the locking plate 22. The locking element 21 is adapted to fit into the recessions to lock the depth position in place and prevent the slidable movement. The user can release the locking element 21 by disengaging it from the locking plate 22 and sliding the first part 3-1 to the desirable distance D from the tip of the outlet end 2-2 and engaging the locking element 21 to the appropriate recession.

It will be obvious to a person skilled in the art that, as the technology advances, the inventive concept can be implemented in various ways. The invention and its embodiments are not limited to the examples described above but may vary within the scope of the claims.

The invention claimed is:

1. A planting tool, comprising:
   a tube element with an inlet end and an outlet end,
   a ground support rotatably connected to the tube element via a pivot point, the ground support comprising:
   a first part with a pedal area and a second part with a hatch area,
   a mechanism comprising a first clamp and a second clamp, wherein the mechanism in an open state prevents movement between the hatch area and the outlet end and maintains the hatch area at a distance from the outlet end by means of contact between the first and the second clamp, and in a closed state prevents movement between the hatch area and the outlet end and maintains the hatch area in contact with the outlet end, and the first clamp comprising a switch allowing a user to change position of said first clamp to switch the state of the mechanism from the open state to the closed state, the mechanism further comprises a first spring connected to the second clamp, and by pulling the tube element towards the user against a spring force of the first spring, switches the state of the mechanism from the closed state to the open state.

2. The planting tool according to claim 1, wherein:

in the closed state prevents movement between the hatch area and the outlet end and maintains the hatch area in contact with the outlet end by means of the spring force from the first spring.

3. The planting tool according to claim 1, wherein the mechanism comprises a second spring connected to the switch for returning the switch and the first clamp to an initial position after the user has changed the position of said first clamp with the switch.

4. The planting tool according to claim 1, wherein:

the second clamp is fixedly attached to the tube element with a protruding first mating surface, the first clamp is movably arranged to the ground support and is provided with a second and a third mating surface facing the tube element, in the open state the first mating surface contacts the third mating surface and in the closed state the first mating surface contacts the second mating surface, and the switch is arranged to move the first clamp to release the contact between the first mating surface and the third mating surface.

5. The planting tool according to one of claim 1, wherein:

the first clamp is movably arranged to the ground support and is provided with a contact surface facing away from the tube element, the second clamp is fixedly attached to the tube element with an end protruding away from the tube element and having a shoulder, in the open state the shoulder contacts the contact surface and in the closed state the shoulder and the contact surface are separated from each other, and the switch is arranged to move the first clamp to release the contact between the shoulder and the contact surface.

6. The planting tool according to claim 5, wherein the ground support comprises a depth adjustment system comprising:

the first part with the pedal area and the second part with the hatch area, the first part is slidably movable along the second part to increase or decrease a distance between the first part and the outlet end, and a user actuated locking element preventing the slidable movement.

7. The planting tool according to claim 1, characterized in that wherein:

movement of the ground support around the pivot point towards the inlet end against the spring force switches the state of the mechanism from the closed state to the open state.

8. The planting tool according to claim 1, wherein:

the outlet end is provided as a truncated cylinder with a sharp tip to provide access to the inside of the tube element via a side of the tube element.

9. The planting tool according to claim 1, wherein:

the ground support has an angled shape where the first part and second part protrude into directions forming an angle between them which may be as large as 90° or more.

* * * * *